Nov. 9, 1926.  1,606,351
D. H. DONACHY
TIRE AND TOOL CARRIER
Filed Nov. 16, 1925　　2 Sheets-Sheet 1
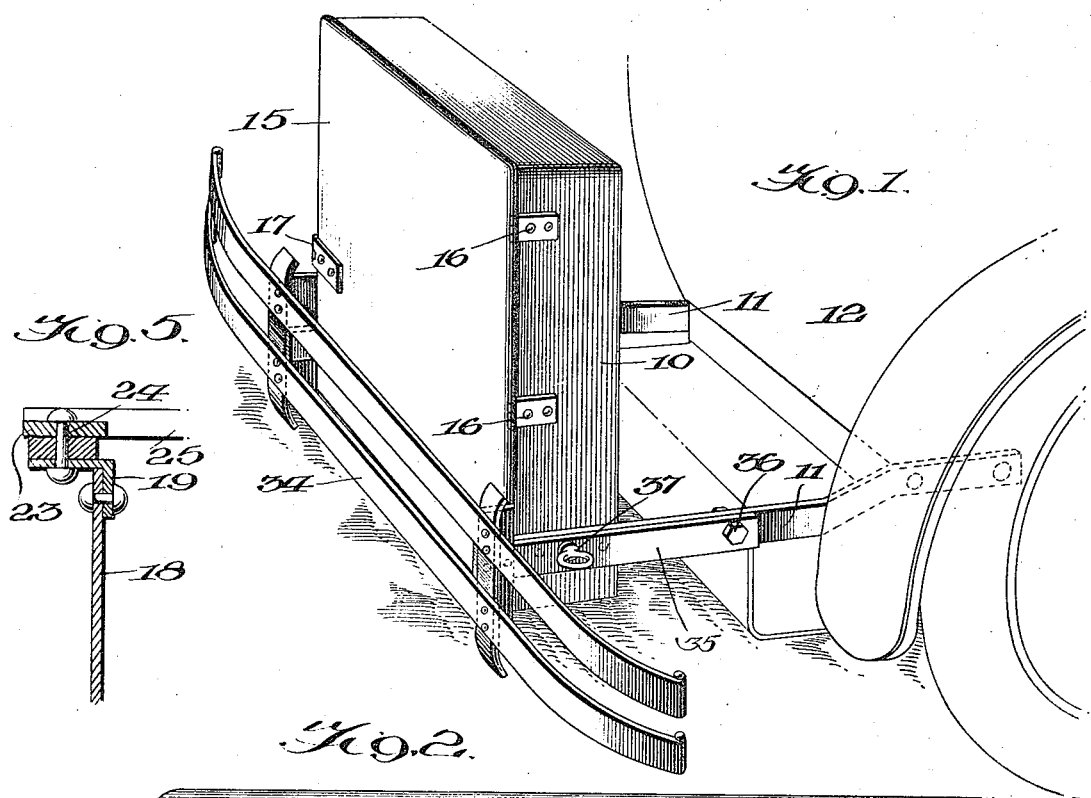
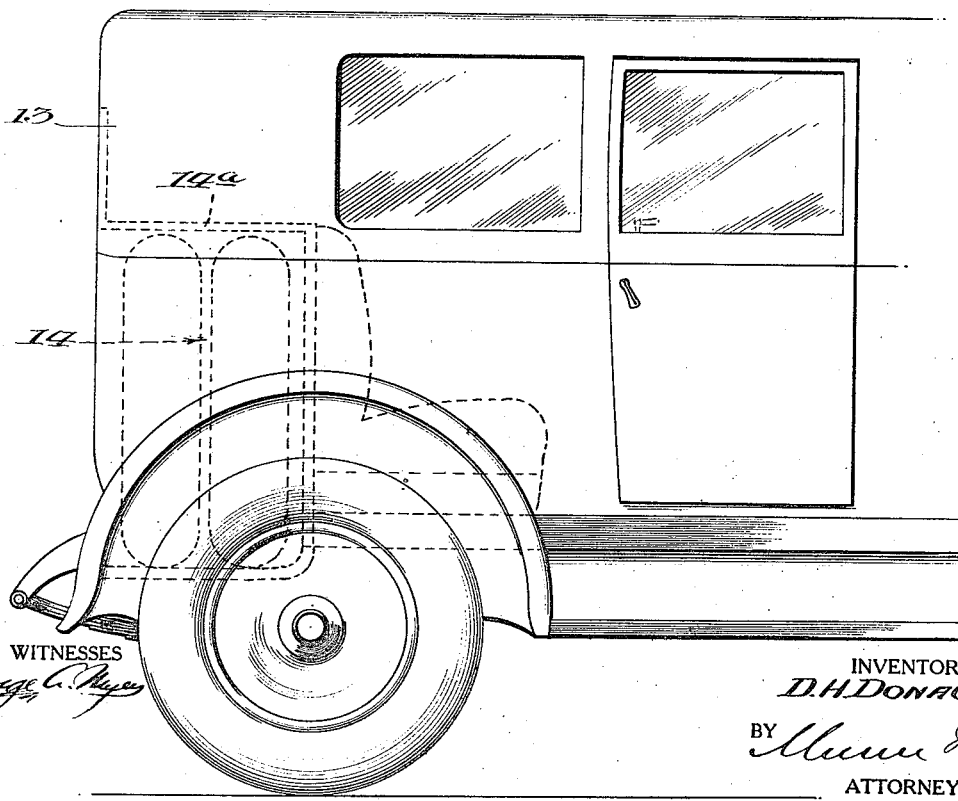
WITNESSES
INVENTOR
D. H. DONACHY,
BY
ATTORNEYS

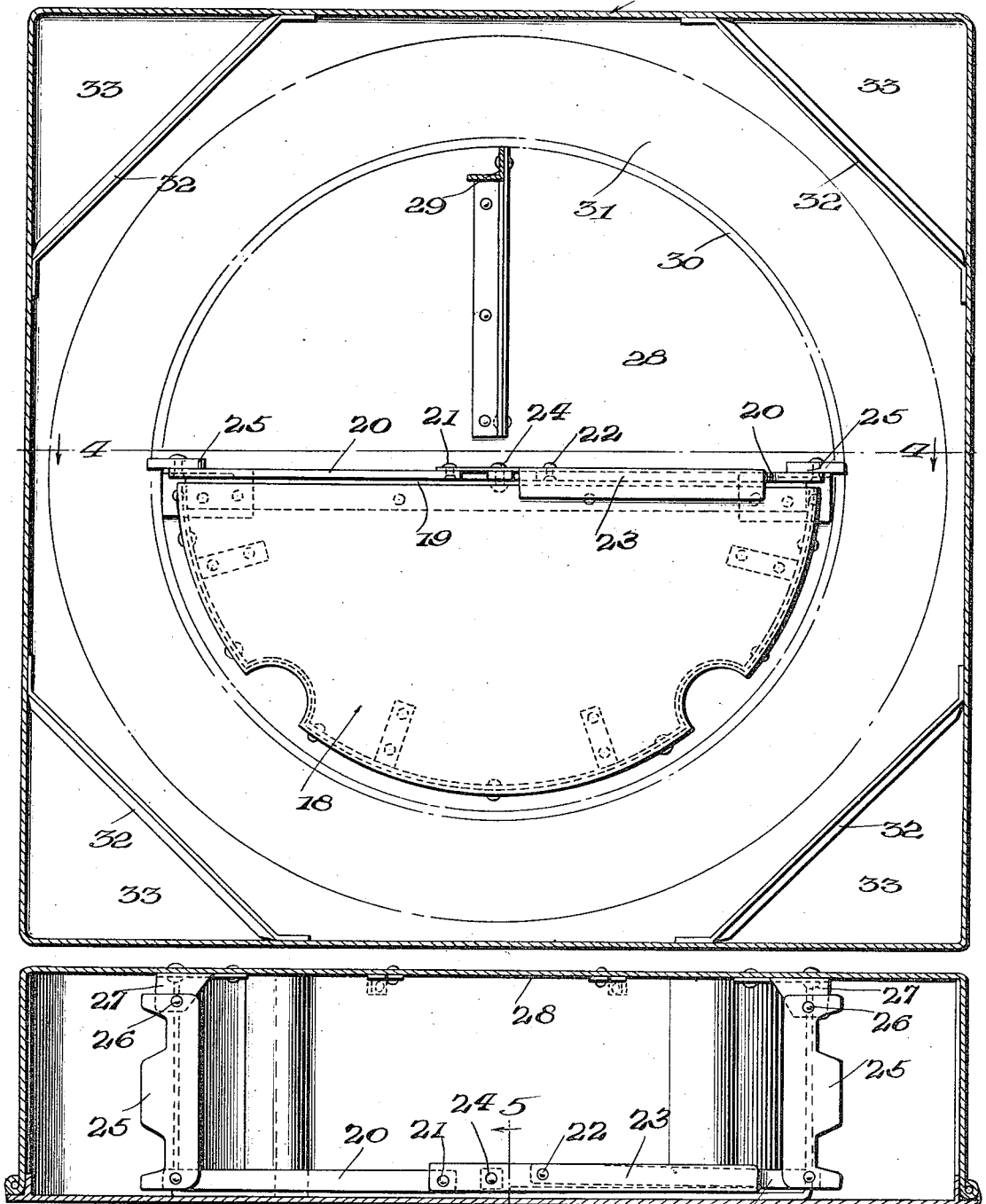

Patented Nov. 9, 1926.

1,606,351

UNITED STATES PATENT OFFICE.

DARWIN H. DONACHY, OF WILLIAMSPORT, PENNSYLVANIA.

TIRE AND TOOL CARRIER.

Application filed November 16, 1925. Serial No. 69,429.

My present invention relates generally to automobiles, and more particularly to spare tire and tool carriers, my primary object being the provision of a box-like holder either secured to the frame of an automobile at its rear or formed as an integral part of the rear portion of the vehicle body, adapted to serve as a tire carrier, and also as a tool holder, and more especially one in which a tire may be supported and protected against sun cracking or other deterioration.

In the accompanying drawings which form a part of this specification and illustrate my invention, Figure 1 is a perspective view illustrating a practical application of my invention in the form of a receptacle added to the rear portion of an automobile frame, Figure 2 is a side view showing a modified arrangement in which my improved holder is in the form of a receptacle constituting a part, and built into the rear, of an automobile body, Figure 3 is a rear elevation of the holder or receptacle with the cover removed therefrom, Figure 4 is a horizontal sectional view taken through the complete receptacle substantially on the line 4—4 of Figure 3, and Figure 5 is a partial vertical section taken on the line 5—5 of Figure 4.

Referring now to these figures, my invention proposes a holder for automobile accessories including spare tires and tools, which is box-like in its general configuration and may be made with either a separate body, such as indicated at 10 in Figure 1, to be rigidly mounted across and between rearwardly extending supporting arms 11 secured at their forward ends to the rear portions of the frame of an automobile as indicated in Figure 1 so that the holder is positioned rearwardly of the body 12 of the vehicle, or may be made as an integral rear part of and built into the body 13 as seen in dotted lines at 14 in Figure 2, the holder being either located beneath a rearwardly projecting portion of the body as shown so that it forms an internal shelf 14ª, or projecting rearwardly beyond the body so that it forms an external shelf for luggage.

In either case the body of the holder opens rearwardly and its internal dimensions are sufficient to receive therein a tire disposed as spare tires usually are upon a demountable rim. Furthermore in either case, the body of the holder or receptacle is normally closed by a rear cover 15 adapted to swing laterally upon hinges 16 at one side and having at its opposite side a hasp and staple or other form of fastening adapted to be locked in order to prevent access by unwarranted persons.

Within the body of the holder or receptacle and fixed below its horizontal center, to its inner wall, is a semicircular upwardly opening tool receptacle 18 whose upper edge is preferably reinforced by an angle bar 19 extending therearound, in order to assist in the support of rim clamping toggle arms 20 whose inner ends are pivotally connected at the spaced points 21 and 22 of a toggle lever 23, the latter of which is fulcrumed at 24 centrally between the points 21 and 22 to the said reinforcing angle bar 19.

The outer ends of the toggle arms 20 are pivotally connected to the otherwise free ends of a pair of rim engaging clamps 25, mounted to swing at their opposite ends upon pivots 26 in connection with brackets 27 upon the inner wall 28 of the body of the holder.

Moreover the rear or inner wall of the body or holder is provided with a stationary rim holding bracket 29 as seen in Figure 3 disposed vertically upon said wall 28 so as to outstand therefrom centrally above the tool receptacle 18, whereby to serve as a support for the upper central portion of a tire rim 30 whose side portions are engaged and held by the clamps 25.

It is obvious that in the normal clamping position of the parts, the toggle lever 23 lies along one of the toggle arms 20, and that swinging movement of the lever in an outward direction serves to draw the arms 20 inwardly away from the rim 30. It is then but a simple matter to remove the rim 30 with its tire 31 from the upper supporting bracket 29 and in this way from the holder as provided by my invention. In placing a tire and rim within the holder it is disposed first upon the bracket 29 so its side portions are opposite the clamps 25 and toggle lever 30 is then forced inwardly so as to separate these clamps into effective engagement with the rim.

It is preferable that the holder be further made of generally rectangular form and that its corners be braced by angular bracing arms 32 which form between them and the extreme corners of the holder, spaces 33 adapted to serve as storage spaces for various supplies constituting convenient portions of equipment of an automobile or other motor car.

Where my improved holder is utilized as a separate feature rearwardly of the body of an automobile or other motor car, it is preferably protected by a rear bumper 34 and in order to permit of the ready swinging of the cover 15 to and from closed position, this bumper 34 preferably has laterally spaced arms 35 pivotally connected at their forward ends as at 36 to the rearwardly extending supporting arms 11 of the vehicle frame, so that the bumper whose arms 35 are normally locked by side screw locks 37, may upon unscrewing these side locks 37, be swung downwardly on the pivots 36 below the lower portion of the holder, permitting the door 15 to be readily opened and closed. Obviously, however, such a construction is not an essential part of the invention since it is not necessary in the construction shown in Figure 2 where the holder of my invention is built into and forms an integral part of the rear portion of the vehicle body.

I claim:—

1. A box-like holder for spare tires and tools of vehicles open at its rear side and having therein a space adapted to receive a spare tire and rim, a supporting bracket in the upper portion of said space, a rim clamping toggle arrangement horizontally across said space including an opening and closing lever movable through the open side of the holder, an upwardly opening receptacle within the lower portion of said space constituting in part the support of said toggle clamping arrangement and a cover for the open side of the holder normally preventing opening movement of the toggle lever.

2. A box-like holder for automobile tires and tools open at one side and having therein an upwardly opening tool receptacle, and a rim clamping toggle mechanism within the holder supported in part by the said receptacle and a cover normally preventing opening movement of the toggle mechanism.

3. A holder for the spare tires of vehicles consisting of a rigid body open at one side, rim clamping means therein, and a rigid swinging door having a locked connection with said body for closing its open side, said door operating when closed, to hold the rim clamping means in effective position.

4. A box-like holder for automobile tires and tools, having a rigid body, a semi-circular upwardly opening tool receptacle in said body having a reinforcing bar around its upper edge, and a tire clamping toggle arrangement within the body supported in part upon the reinforcing bar of the tool receptacle, and a hinged door normally closing the body and adapted to be locked thereto.

5. A box-like holder for automobile tires and tools including a body of rigid form, a semi-circular upwardly opening tool receptacle in the lower portion of the body, a rim supporting bracket spaced above the center of said receptacle, a rim clamping toggle arrangement operating horizontally in the holder and supported in part upon the upper edge of the said tool receptacle, and a rigid cover hinged to and normally closing the body of the holder.

DARWIN H. DONACHY.